E. NORRBOM.
PITMAN CONNECTION.
APPLICATION FILED JAN. 8, 1918.

1,289,882.

Patented Dec. 31, 1918.

WITNESSES
Frank J. Paggiani.
Geo. L. Beeler

INVENTOR
Enock Norrbom
BY Munn & Co
ATTORNEYS

UNITED STATES PATENT OFFICE.

ENOCK NORRBOM, OF BROOKLYN, NEW YORK.

PITMAN CONNECTION.

1,289,882. Specification of Letters Patent. Patented Dec. 31, 1918.

Original application filed July 20, 1917, Serial No. 181,743. Divided and this application filed January 8, 1918. Serial No. 210,871.

*To all whom it may concern:*

Be it known that I, ENOCK NORRBOM, a citizen of the United States, and a resident of the city of New York, borough of Brooklyn, in the county of Kings and State of New York, have invented new and Improved Pitman Connections, of which the following is a full, clear, and exact description.

This invention relates to machine elements and has particular reference to pitman connections.

Among the objects of the invention is to provide a simple, strong and durable connection between an engine piston and the connecting rod for the crank shaft of an engine of the novel type shown and claimed in an application for Letters Patent of the United States filed by me on the 20th day of July 1917, Serial No. 181,743, and of which application this is a division.

More specifically stated the object of this improvement is to provide a pitman connection that possesses maximum strength and durability, but which occupies a minimum amount of space with respect both to the direct connection and the clearance provided for the oscillation of the pitman.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1:
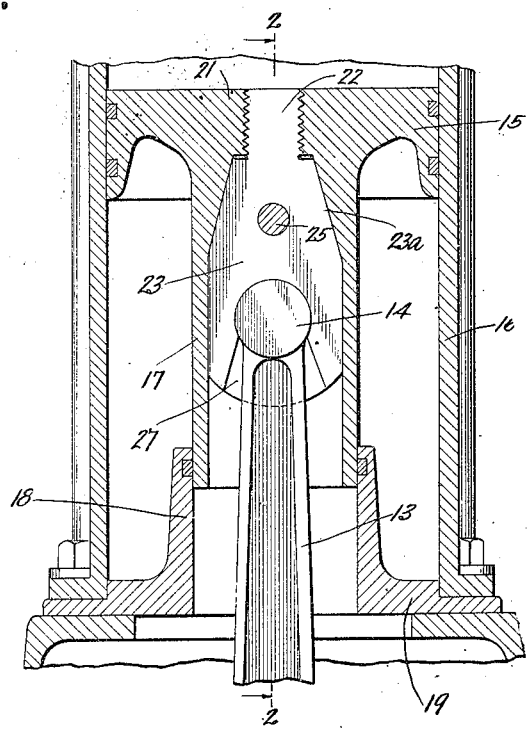
Figure 1 is a vertical sectional view on the line 1—1 of Fig. 2.
Figure 2:
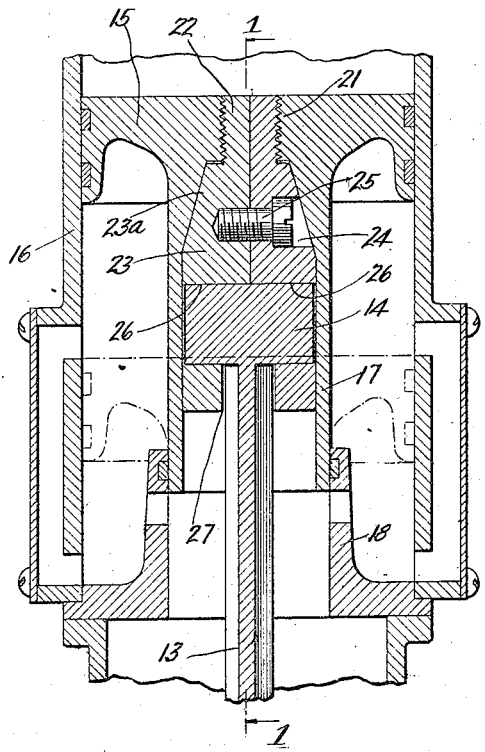
Fig. 2 is a similar view on the line 2—2 of Fig. 1.

Inasmuch as my improvement was designed primarily for use in connection with the special type of engine above referred to I employ the engine structure in illustrating the novel features of this specification, and while I refer to the engine parts for the purpose of illustration, I wish it to be distinctly understood that the practice of this improvement is not intended to be so limited by any means.

13 indicates a connecting rod which is presumed to be connected with the crank shaft as usual and provided at its upper end with a T-head 14. 15 represents in the drawings an engine piston adapted to reciprocate for the usual purposes in a cylinder 16. For general purposes the piston may be regarded as a crosshead, and the cylinder 16 as a guide in which the crosshead reciprocates. The piston, however, is provided with a downwardly projecting tubular cylinder extension 17 having a smooth outer surface acting as a piston in a boss 18 constituting a part of the base 19 of the main cylinder.

The piston 15 is centrally tapped at 21 to receive the threaded shank 22 of a two part anchor block 23 fitted into the interior of the extension 17. This block consists of two substantially similar parts, the only difference being that one is countersunk at 24 for the head of a binding screw 25 extending therethrough into the other block part. These block elements are provided with transverse registering holes 26 into which the ends of the T-head 14 project, the T-head being cylindrical and adapted to rock in the bearing holes 26 in accordance with the rotation of the crank shaft or the oscillation of the connecting rod according to the construction or action of the machine to which the lower end of the connecting rod is attached.

The lower ends of the block elements are cut away at 27 to provide a clearance for the upper end of the connecting rod while making its oscillations in the block 23.

In assembling these parts the block elements are slipped upon the ends of the head 14 and clamped together by the screw 25. The anchor block is then projected into its place in the crosshead, and relative rotation between the crosshead and the anchor block is then set up to tighten the block in the crosshead. The shoulder portion of the main part of the block is formed conical or frusto-conical at 23ª whereby the block acts as a wedge so as to bind snugly into the piston as a result of the action of the threaded shank 22. It will thus be seen that the connecting rod is fixed most reliably in the piston or what might be termed a crosshead with respect to the oscillatory member 13 in such a manner as to bring the connection well within the body of the piston or crosshead. It is further to be noted that there is no possibility for the anchor block to become loose in practice. Even though the screw 25 might be omitted there is yet a positive and reliable anchorage provided for the connecting rod so long as the anchor block is tapped into the piston or crosshead.

I claim:

1. In a device of the character set forth, the combination with a guideway and a crosshead adapted to reciprocate therein, said crosshead being provided with a hollow extension terminating in a threaded socket, of a connecting rod having a cylindrical T-head projecting into said hollow extension, and a two part anchor block having alined bearing openings to receive the ends of the cylindrical T-head, said block having a threaded shank adapted to screw tightly into said threaded socket to hold the block from endwise movement with respect to the crosshead while the hollow extension serves to prevent lateral separation of the two parts thereof.

2. The combination with a crosshead adapted to reciprocate along a guideway and having a central hollow extension formed with a frusto-conical seat, of a connecting rod having a journal and an anchor block having a bearing in which the journal of the connecting rod is fitted, said block and adjacent end of the connecting rod being fitted into the hollow extension of the crosshead, the anchor block having a frusto-conical shoulder and a threaded shank adapted to project into the threaded socket, whereby the anchor block is fixed snugly in the crosshead extension and the connecting rod held from separation therefrom.

ENOCK NORRBOM.